United States Patent [19]
Kawa

[11] Patent Number: 5,850,678
[45] Date of Patent: Dec. 22, 1998

[54] CONDENSER AND THE PRODUCTION METHOD THEREOF

[75] Inventor: Kazuo Kawa, Akiruno, Japan

[73] Assignee: JCC Engineering Co., Ltd., Tokyo, Japan

[21] Appl. No.: 717,326

[22] Filed: Sep. 20, 1996

[30] Foreign Application Priority Data

Apr. 17, 1996 [JP] Japan .................................. 8-121118

[51] Int. Cl.⁶ .............................. B65H 18/26; H01G 7/00
[52] U.S. Cl. ..................... 29/25.42; 361/306.1; 361/313; 242/547
[58] Field of Search ................................. 29/25.42, 738; 361/306.1, 301.1, 303, 313; 242/547

[56] References Cited

U.S. PATENT DOCUMENTS

| | | | |
|---|---|---|---|
| 1,385,379 | 7/1921 | Kratz | 29/25.42 X |
| 1,841,628 | 1/1932 | Pickard | 29/25.42 X |
| 2,248,621 | 7/1941 | Gillette | 29/25.42 X |
| 2,328,520 | 8/1943 | West | 29/25.42 X |
| 3,163,374 | 12/1964 | Horn et al. | 29/25.42 X |
| 4,377,891 | 3/1983 | Wallace | 29/25.42 X |
| 4,870,729 | 10/1989 | Ikeda | 29/25.42 X |
| 5,316,226 | 5/1994 | Kaito | 29/25.42 X |

*Primary Examiner*—Linda Johnson
*Attorney, Agent, or Firm*—Finnegan, Henderson, Farabow, Garrett & Dunner, L.L.P.

[57] ABSTRACT

A condenser and the production method thereof are disclosed, wherein the condenser is composed of a positive foil sheet, a negative foil sheet and an isolating sheet which are placed one on another in combination, a plurality of lead terminals and another plurality of lead terminals, the one plurality of lead terminals being positioned at a circumferentially same phase and arranged in alignment in one radial direction of the cylindrical condenser and the another plurality of lead terminals being positioned at a circumferentially same phase and arranged in alignment in another radial direction of the cylindrical condenser; and wherein the production method is to attach the one and another plurality of lead terminals to the positive foil sheet and the negative foil sheet respectively with a predetermined space provided therebetween, and then roll up the combined sheets by cooperation of a rotational sheet rolling up shaft and a rotational drive roller which is pressed against the circumferentially outer surface of the combined sheets on the sheet rolling up shaft so as to prevent uneven tensions being applied to the combined sheets as the sheets are rolled up.

3 Claims, 11 Drawing Sheets

CONDENSER AND THE PRODUCTION METHOD THEREOF

FIELD OF THE INVENTION

The present invention relates to a condenser and the production method thereof, and more particularly relates to rolling up into a roll a positive foil sheet, a negative foil sheet and an isolating sheet which are placed one on another in combination with a plurality of lead terminals and another plurality of lead terminals attached to the positive foil sheet and the negative foil sheet respectively with a predetermined space provided therebetween while a rotational drive roller is pressed against the circumferentially outer surface of the roll to eliminate the tensions which may be applied to the combined sheets as the sheets are rolled up thereby to arrange the one and another plurality of lead terminals in alignment in the respective radial directions of the roll. Thus the present invention will enable the condensers of extremely large capacity to be produced at a reduced cost as a secondary battery which may be employed, for example, for the electric vehicle. The above-mentioned isolating sheets are such that are placed between the positive foil sheet and the negative foil sheet to isolate the one from the other, and may be a paper, a synthetic resin film, etc., in case of a film condenser, and an electrolytic paper in case of an electrolytic condenser.

BACKGROUND OF THE INVENTION

So far the film condenser and the electrolytic condenser have been produced by rolling up into a condenser element a positive foil sheet, a negative foil sheet and an isolating sheet which are placed one on another in combination while a lead terminal is attached to the positive foil sheet and the negative foil sheet respectively. The condenser element is inserted into an aluminum housing having a bottom. The condenser produced in this manner may have an electric capacity between the positive foil sheet and the negative foil sheet. With the two lead terminals protruded out of the aluminum housing, the condenser is connected to an electric circuit.

In FIG. 12, a condenser 1 of a large capacity is often produced with a plurality of negative lead terminals 2 and another plurality of positive lead elements 3 attached to the negative foil sheet 5 and the positive foil sheet 4 respectively so as to reduce the surge impedance and increase the property of the condenser. The conventional method for producing the condenser is to anchor to a sheet rolling up shaft (not shown) one end of the positive foil sheet 4, the negative foil sheet 5 and the isolating sheet 6 which are placed one on another in combination, and to rotate the sheet rolling up shaft to roll up the combined sheets as supplied from a sheet supplying source (not shown). However according to the sheet rolling up method, the combined sheets are subjected to the fluctuating tensions caused from the sheet rolling up movement. Especially the precededly rolled up sheets are more intensely tightened as the sheets are incrementally rolled up. Actually it has been difficult to roll up the combined sheets with an even degree of tension all through the radial direction of the roll.

The condenser rolled up with uneven degrees of tension will come to have the negative lead terminals 2 the positive lead terminals 3 circumferentially shifted from each other respectively. Such circumferentially shifted lead terminals have caused inconvenience when the condenser is connected to an electric circuit.

On the other hand, in place of the vehicle driven by the gasoline engine and/or diesel engine which are now at issue over the pollution of globe environments due to the car exhaust, the electric motor vehicle has come to be developed. However the remarkable defects of the electric motor vehicle are as follows: (I) the storage battery is very heavy, (II) the running distance is short per charging, (III) charging requires a long time, (IV) the cost is expensive, and so on. In order to eliminate such defects, various storage batteries have been proposed and have contributed, although slightly, to the practical use of the electric motor vehicle. Under the present circumstances a wide use of the electric vehicle is on a far way to realization, and the future perspective remains obscure. This is because the storage battery is not developed, which is of light weight and may be repeatedly charged and discharged, and further is of a large capacity to be charged in a short time and produced at a reduced cost.

OBJECTS OF THE INVENTION

The present invention has been provided to eliminate the defects and disadvantages of the prior art. It is therefore a principal object of the invention to roll up into a rolled condenser a positive foil sheet and a negative foil sheet having a plurality of positive lead terminals and a plurality of negative lead terminals attached thereto respectively by way of cooperation of a rotational sheet rolling up shaft and a rotational drive roller which is pressed against the circumferentially outer surface of the roll formed on the sheet rolling up shaft in such manner that the positive lead terminals and the negative lead terminals are positioned at a circumferentially same phase and arranged in alignment in the respective radial directions of the roll, thereby to make it easy to connect the condenser to an electric circuit and simultaneously to reduce the tolerances of the circuits having the condenser incorporated therein.

It is another object of the invention to roll up into a rolled condenser a positive foil sheet, a negative foil sheet and an isolating sheet which are placed one on another in combination, the positive foil sheet and the negative foil sheet having a plurality of lead terminals attached thereto respectively with a predetermined space provided therebetween by way of cooperation of a rotational sheet rolling up shaft and a rotational drive roller, the sheet rolling up shaft having one end of the combined sheets anchored thereto and the drive roller being pressed against the circumferentially outer surface of the roll formed on the sheet rolling up shaft after the first of the lead terminals of each of the positive foil sheet and the negative foil sheet has been rolled up, thereby to eliminate a tension which may otherwise be applied to the precededly rolled up combined sheets, thus to prevent even a big sized condenser from having the combined sheets unevenly tightened, thus to provide a condenser having the positive lead terminals and the negative lead terminals arranged in alignment in the respective radial directions of the rolled condenser.

It is another object of the invention to roll up into a rolled condenser a positive foil sheet, a negative foil sheet and an isolating sheet which are place one on another in combination, the positive foil sheet and the negative foil sheet having a plurality of lead terminals attached thereto respectively by means of a lead terminal attaching device, the rolling up operation being performed by cooperation of a rotational sheet rolling up shaft and a rotational drive roller, the sheet rolling up shaft having one end of the combined sheets anchored thereto and the drive roller being pressed against the circumferentially outer surface of the roll formed on the sheet rolling up shaft, thereby to eliminate tensions which may otherwise be applied to the precededly rolled combined sheets so that the combined sheets may be rolled up with an even tension applied thereto, thus to produce a constantly and evenly solid condenser.

It is another object of the invention to make sure that a big sized condenser may be produced with the method and mechanism as mentioned above, the condenser being of light weight and bearable with repeated charge and discharge and being of a specially large charging capacity and chargeable in a short time and of a reduced cost. Namely according to the invention, it is possible to produce a big sized condenser which may be used as a secondary battery which may be of a diameter more than 50 mm φ and of a length more than 150 mm. Such a condenser will make it possible to realize a wide use of electric motor vehicle and solve the problem of car exhaust which will give rise to environment pollution.

It is still another object of the invention to use the condenser as mentioned above, instead of the lead storage battery, as a secondary battery for an electric motor vehicle. Since the condenser is made of paper and aluminum, it will not give rise to the problem of poisonous waste matter treatment which will arise in case of the lead storage battery. The used condenser may be extremely easily and safely treated without giving adverse influence to the environments.

SUMMARY OF THE INVENTION

In short, the invention relates to a condenser and the production method thereof wherein the condenser is composed of a positive foil sheet, a negative foil sheet and an isolating sheet which are placed one on another in combination, a plurality of lead terminals and another plurality of lead terminals, the one plurality of lead terminals being positioned at a circumferentially same phase and arranged in alignment in one radial direction of the cylindrical condenser and the another plurality of lead terminals being positioned at a circumferentially same phase and arranged in alignment in another radial direction of the cylindrical condenser; and wherein the production method is to attach the one and another plurality of lead terminals to the positive foil sheet and the negative foil sheet respectively with a predetermined space provided therebetween, and then roll up the combined sheets by cooperation of a rotational sheet rolling up shaft and a rotational drive roller which is pressed against the circumferentially outer surface of the roll of the combined sheets on the sheet rolling up shaft so as to prevent uneven tensions from being applied to the combined sheets as the sheets are rolled up.

BRIEF DESCRIPTION OF THE DRAWINGS

FIGS. 1 through 11 show the embodiment of the invention, in which,

FIG. 1 is a perspective view of a condenser shown partly in section;

FIG. 2 is a vertical sectional view of the condenser;

FIG. 3 is a perspective view of a condenser element;

FIG. 4 is a perspective of the essential parts of a condenser producing device;

FIG. 5 is a front elevational view of the essential parts of the condenser producing device;

FIG. 6 is aside elevational view of the essential parts of the condenser producing device;

FIG. 7 is a front elevational view of the essential parts of the condenser producing device showing the beginning of rolling up the condenser sheets;

FIG. 8 is a front elevational view of the parts showing a drive roller just starting to be driven;

FIG. 9 is front elevational view of the drive roller and a sheet rolling up shaft rolling up the condenser sheets in cooperation;

FIG. 11 is a front elevational view of the parts for eliminating the tensions to be applied to the precededly rolled up positive foil sheet, negative foil sheet and isolating sheet.

DETAILED DESCRIPTION OF THE EMBODIMENT

Figure 4:
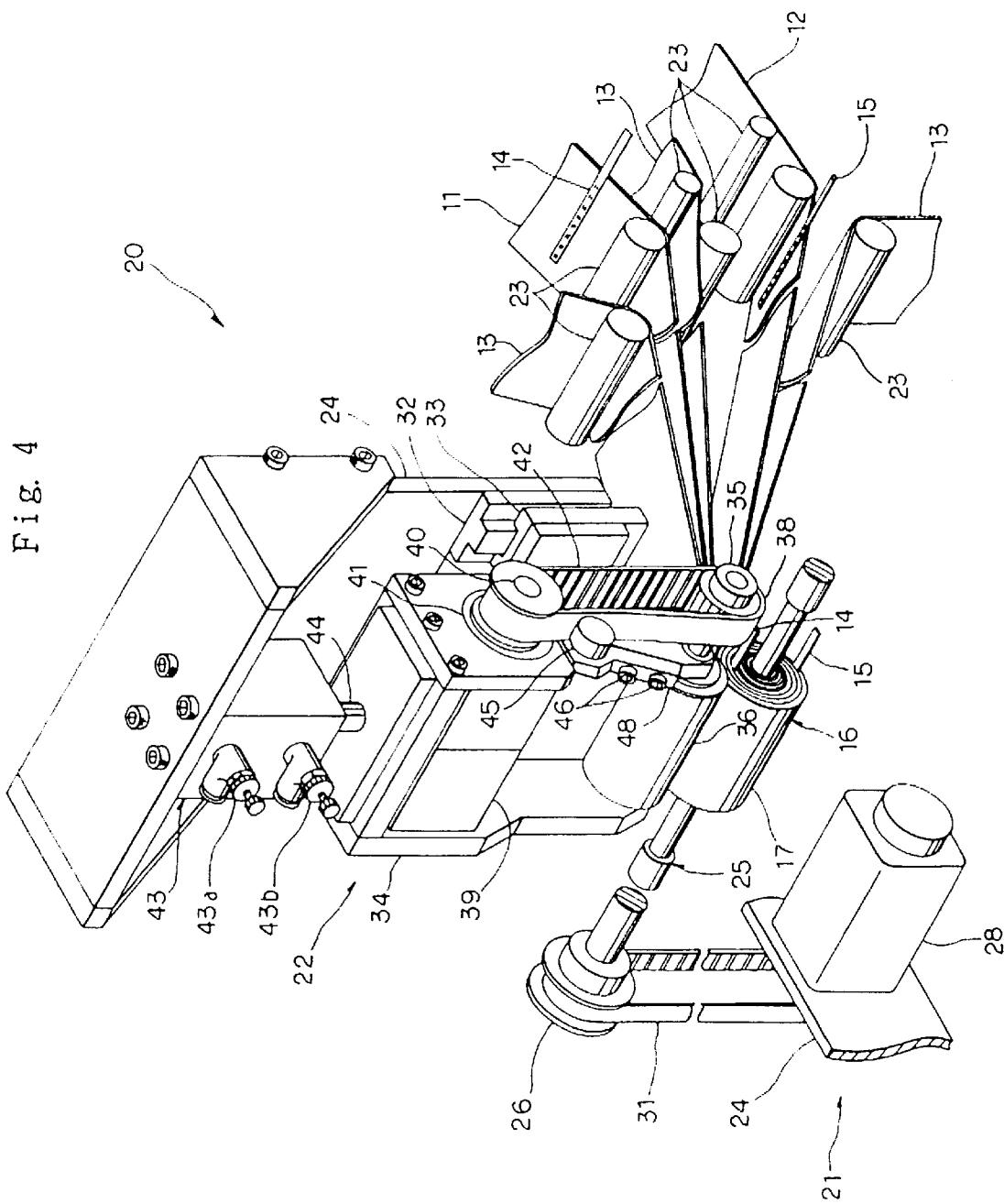
Figure 5:
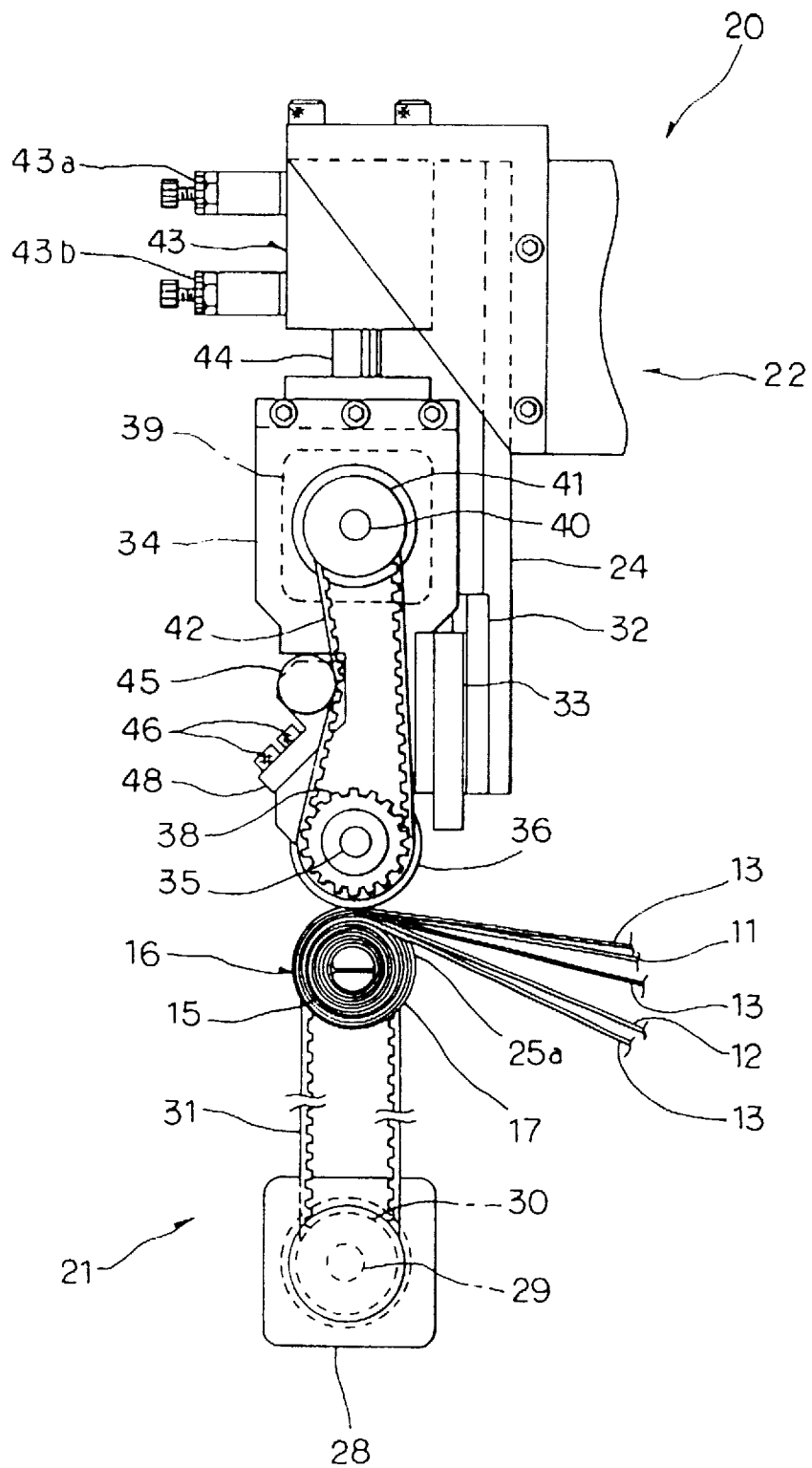
Figure 6:
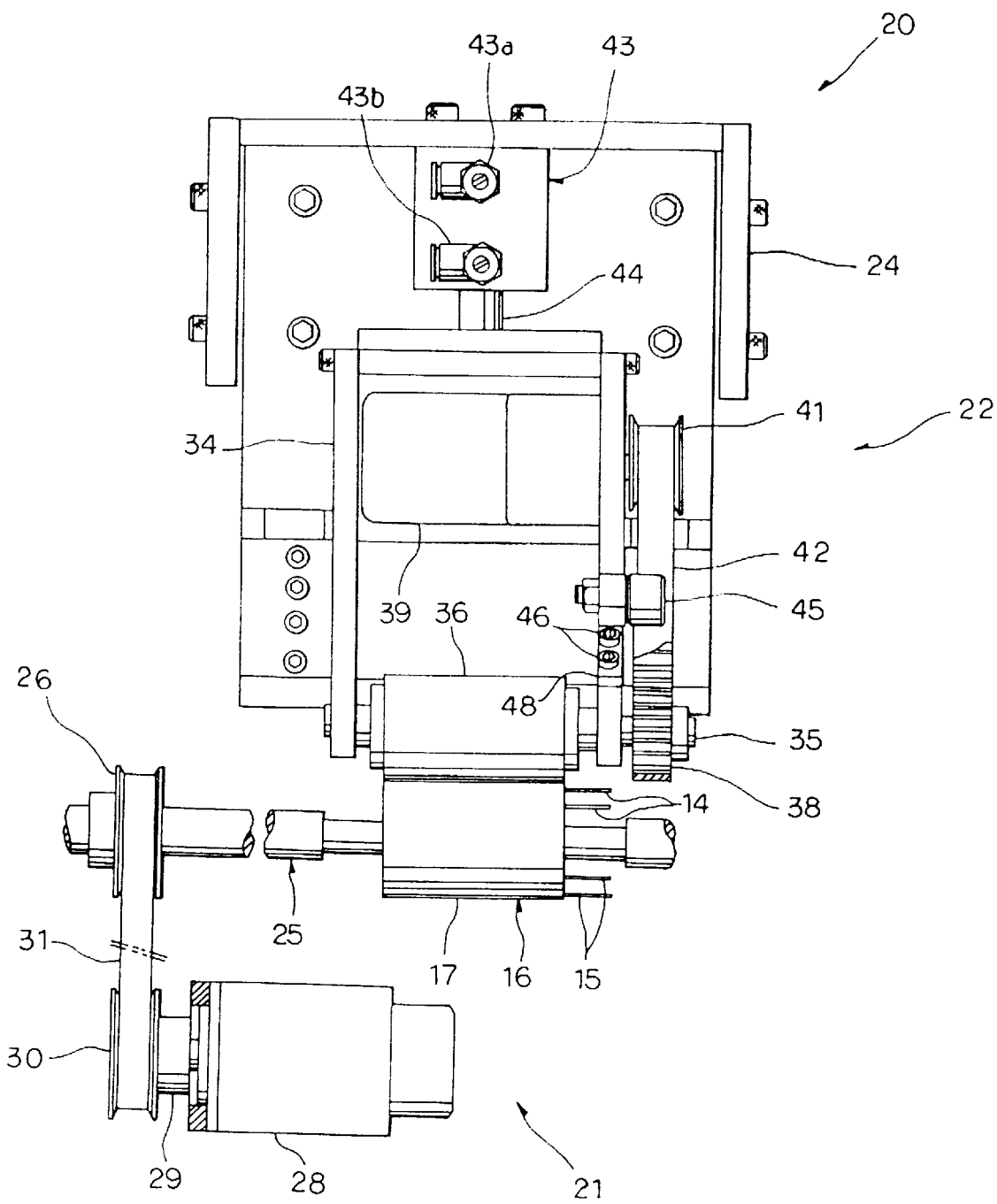

The present invention will now be described in reference to the embodiment as shown in the attached drawings. In FIGS. 4 through 6, a condenser producing device 20 is provided with a lead terminal attaching section (though it is not shown), a sheet rolling up section 21 and an auxiliary rolling up section 22. A condenser 10 produced by the condenser producing device 20 is substantially composed of a positive foil sheet 11, a negative foil sheet 12, an isolating sheet 13, positive lead terminals 14 and negative lead terminals 15 as shown in FIGS. 1 through 3.

Figure 3:
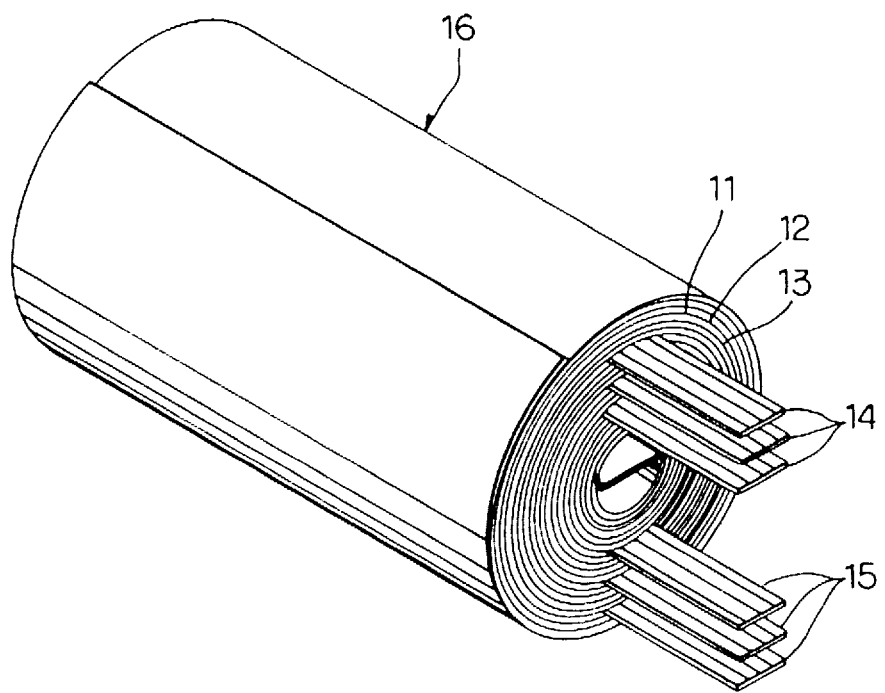

Particularly in reference to FIG. 3, the condenser 10 is composed of a condenser element 16 of the positive foil sheet 11 having a plurality of positive lead terminals 14 fixedly attached thereto, the negative foil sheet 12 having a plurality of negative lead terminals 15 fixedly attached thereto and the isolating sheet 13 placed between the positive foil sheet 11 and the negative foil sheet 12, the sheets 11, 12, 13 being integrally rolled up while the plurality of positive lead elements 14 are positioned at a circumferentially same phase and arranged in alignment in one radial direction of the condenser and the plurality of negative lead elements 15 are placed at a circumferentially same phase in alignment in another radial direction of the condenser. The isolating sheet 13 is placed between the positive and negative foil sheets 11 and 12 to isolate the one from the other. The isolating sheet 13 maybe a paper, a synthetic resin film, etc.,in case of the film condenser and may be an electrolytic paper in case of the electrolytic condenser.

Figure 1:
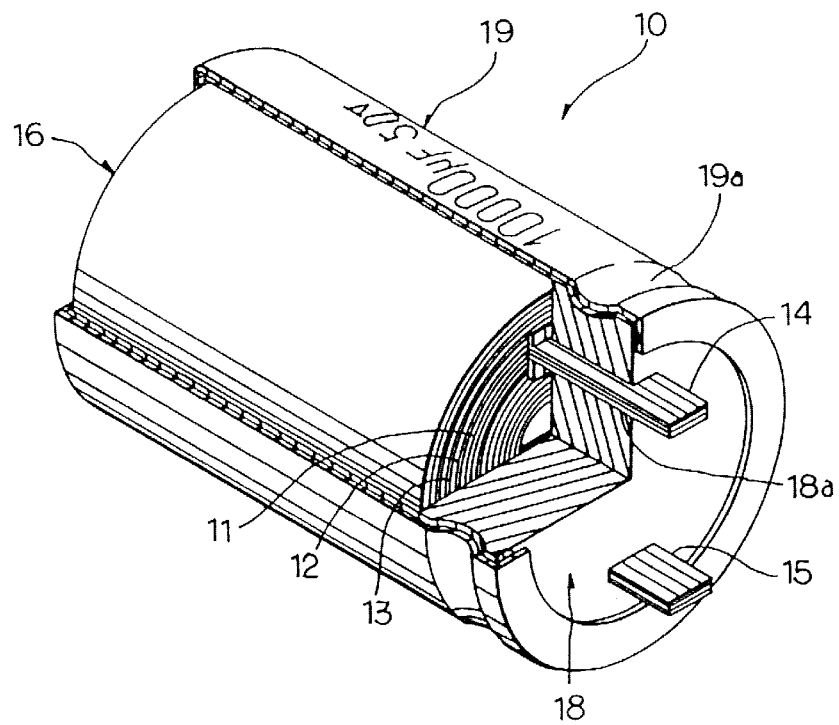
Figure 2:
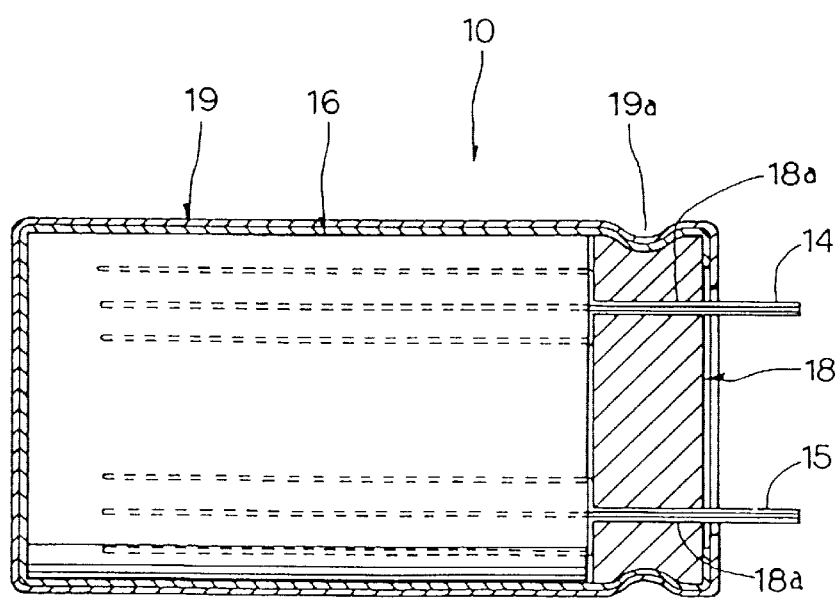

In reference to FIGS. 1 and 2, the plurality of positive and negative lead terminals 14, 15 are bent at the base thereof to be brought into contact with each other in each group. The condenser element 16 is subsequently inserted into an aluminum housing 19 having a bottom and is covered with a sealing member 18 which is inserted into the opened end of the housing 19 while the contacted positive and negative lead terminals 14, 15 are extended out of the aluminum housing 19 through the holes 18a of the sealing member 18 respectively. The housing 19 is then processed to have the opened end constructed into a neck 19a. Thus the aluminum housing 19 is sealed with the sealing member 18.

Now in reference to FIGS. 4 through 6 showing the condenser producing device 20, the lead terminal attaching section (though this is not shown) is provided to fixedly attach the positive and negative lead terminals 14, 15 to the respective positive and negative foil sheets 11, 12 with a predetermined space provided therebetween. This section is composed of a subsection for automatically supplying the positive and negative lead terminals 14, 15 and another subsection for automatically fix the supplied positive and negative lead terminals 14, 15 to the respective positive and negative foil sheets 11, 12. This section is so structured as to process the positive and negative lead terminals 14, 15 to make spot facings thereon respectively and fixedly attach the lead terminals 14, 15 to the positive and negative foil sheets 11, 12 respectively with a predetermined space provided therebetween as the sheets 11, 12 come to the section guided by guide rollers 23, respectively from the rolled sheet supplies.

The sheet rolling up section 21 is provided to integrally roll up the positive foil sheet 11, the negative foil sheet 12 and the isolating sheet 13, and includes a rolling up shaft 25 which is rotatable and axially movable on a swingable arm (not shown) which is mounted on a base frame 24. The rolling up shaft 25 has one a groove 25a axially formed thereon for anchoring thereto the positive and negative foil sheets 11, 12 and the isolating sheet 13 which are placed one on another in combination.

The rolling up shaft 25 is rotated by an electric motor 28 having a rotational shaft 29 and mounted on the base frame 24 and the rotation transmission means including a pulley 30 secured to the rotational shaft 29, another pulley 26 secured to the rolling up shaft 25 and an endless transmission belt 31 extended around the two pulleys 26, 30.

The electric motor 28 is a servomotor driven at a rotation speed and with a number of rotations regulated by a control section (not shown). The electric motor 28 is set to rotate at a rotation speed to be reduced as the diameter of the rolled condenser element 16 becomes larger so that the positive and negative foil sheets 11, 12 and the isolating sheet 13 are rolled up at a constant speed. Further the electric motor 28 is set to rotate until the motor comes to a predetermined total number of rotations.

The auxiliary rolling up section 22 is so structured as to give a rotational pressure to the circumferentially outer surface of the positive and negative foil sheets 11, 12 and the isolating sheet 13 which are placed one on another so as to roll up these sheets in cooperation with the sheet rolling up shaft 25. The auxiliary rolling up section 22 includes a movable base 34 having a dovetail groove 33 secured thereto which is in slidable engagement with a guide member 32 fixedly mounted on the base frame 24, so that the movable base 34 may be vertically slidable.

The movable base 34 has a rubber roller 36 rotationally driven at the lower end thereof on a shaft 35. The rubber roller 36 is rotated by an electric motor 39 having a rotational shaft 40 and arranged on the base frame 24 and the transmission means including a pulley 38 secured to the shaft 35, another pulley 41 secured to the rotational shaft 40 and an endless transmission belt 42 extended around the pulleys 38, 41.

The electric motor 39 is a servomotor, which is so called a torque motor, driven with a constant rotation torque regulated by a control section (not shown). The electric motor 39 is employed to roll up with a constant torque the positive and negative foil sheets 11, 12 and the isolating sheet 13 while these sheets 11, 12, 13 are transported at a constant speed with the rubber drive roller 36 being pressed against the circumferentially outer surface 17 of the sheets.

The movable base 34 is fixedly connected to a piston rod 44 of a fluid press cylinder 43 which is mounted on the base frame 24. The fluid press cylinder 43 is driven by a compressed air supplied to the fluid pressure supply openings 43a, 43b thereof, thereby to axially move the movable base 34 together with the rubber drive roller 36 in the direction where the rubber drive roller 36 will be pressed against the circumferentially outer surface 17 of the sheets 11, 12, 13 and in the opposite direction where the rubber drive roller 36 is away therefrom.

A tension roller 45 is provided to pressingly contact the endless transmission belt 42 so as to give a tension thereto. The tension may be adjusted with positional adjustment of a holder 48 holding the tension roller 45 by manipulating the fixing screws 46.

The condenser production method according to the present invention is as follows: In the method for producing a condenser 10 by placing a positive foil sheet 11, a negative foil sheet 12 and an isolating sheet 13 one on another in combination, the positive foil sheet 11 having, a positive lead terminal attached thereto and the negative foil sheet 12 having a negative lead terminal attached thereto, and by rolling up the positive and foil sheets 11, 12 and the isolating sheet 13, (I) fixedly attaching r plurality of positive lead terminals 14 to the positive foil sheet 11 with a predetermined space provided therebetween and a plurality of negative lead terminals 15 to the negative foil sheet 15 with a predetermined space provided therebetween, (II) rotating the sheet rolling up shaft 25 to roll up the so combined positive and negative foil sheets 11, 12 and isolating sheet 13 while one end of the sheets 11, 12, 13, is anchored to the sheet rolling up shaft 25, (III) in the meantime, pressing a drive roller 36 as it is rotated against the circumferentially outer surface 17 of the positive and negative foil sheets 11, 12, 13 while these sheets are rolled up, so that the roller 36 will cooperate with the sheet rolling up shaft 25 to prevent the rolled sheets from being unevenly tightened and to position the plurality of positive lead terminals 14 in one group at a circumferentially same phase and arrange the same in alignment in one radial direction of the roll, and to position the plurality of negative lead terminals 15 in the other group at a circumferentially same phase and arrange the same in alignment in another radial direction of the roll.

In the above mentioned condenser production method, the roller 36 may be pressed against the circumferentially outer surface of the rolled sheets 11, 12, 13 after the first positive and negative lead terminals 14, 15 in the respective groups have been rolled up.

Figure 11:
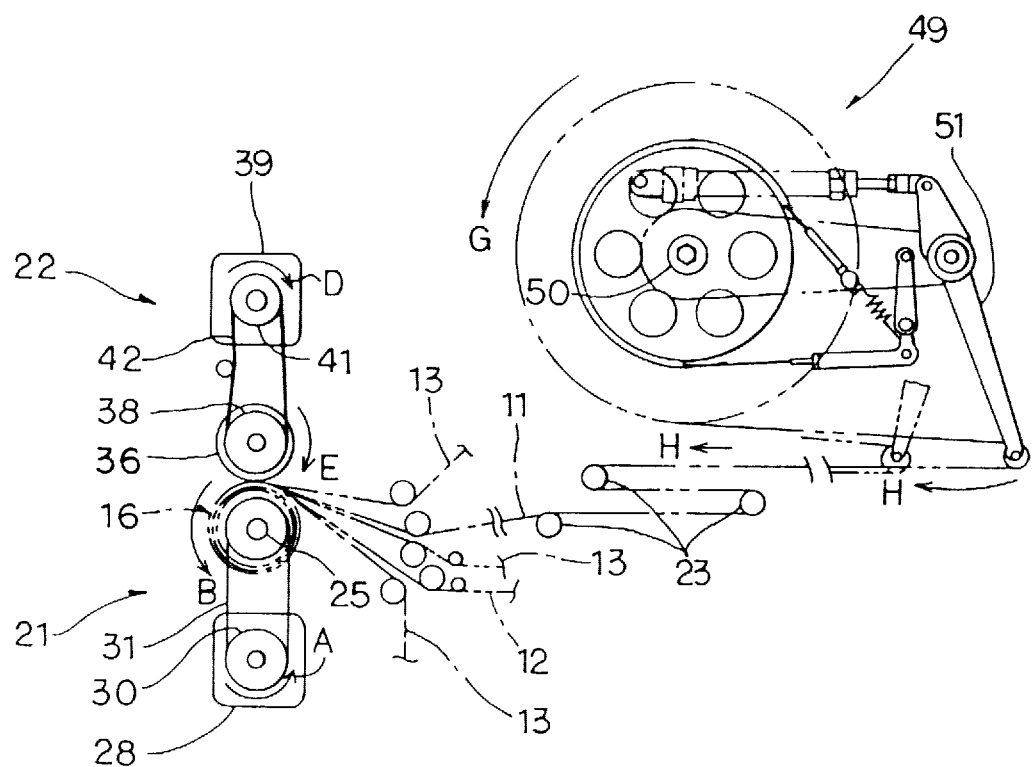
Figure 12:
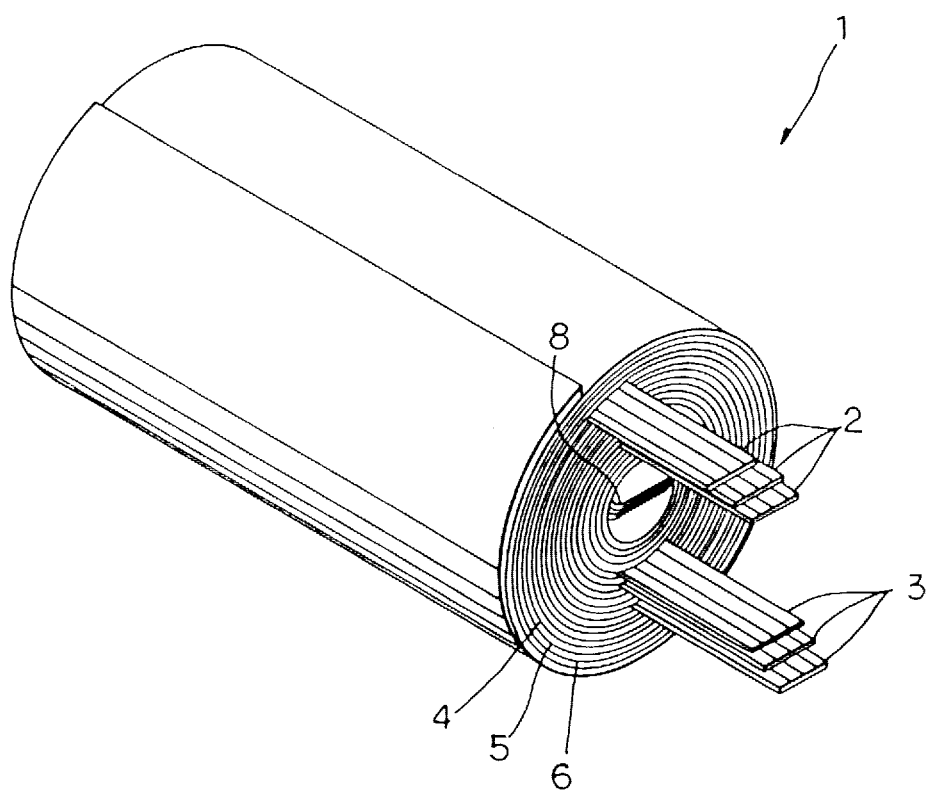
FIG. 12 is a perspective view of the conventional condenser element.

The embodiment of the invention is structured as mentioned above, and the operation is as follows: In reference to FIG. 11 showing a section 49, for convenience sake, for supplying only the positive foil sheet 11, the rolled positive foil sheet 11 is set onto a roll shaft 50 of the sheet supplying section 49 and is unrolled to the sheet rolling up shaft 25 while the positive foil sheet 11 is guided by a plurality of the guide rollers 23, and the end of the sheet 11 is anchored to the groove 25a of the sheet rolling up shaft 25 of the sheet rolling up section 21, so that anchored sheet may be rolled up as the sheet rolling up shaft 25 is rotated.

In the same manner, the negative foil sheet 12 and the isolating sheet 13 are separately set to the respective sheet supplying sections 49 and unrolled to the sheet rolling up shaft 25 of the sheet rolling up section 21. In FIG. 11, a first isolating sheet 13 is located at the upper most position. Below the isolating sheet 13, the positive foil sheet 11 is located. Below the positive foil sheet 11, a second isolating sheet 13 is located. Below the second isolating sheet 13, the negative foil sheet 12 is located. Below the negative foil sheet 12, a third isolating sheet 13 is located.

Figure 7:
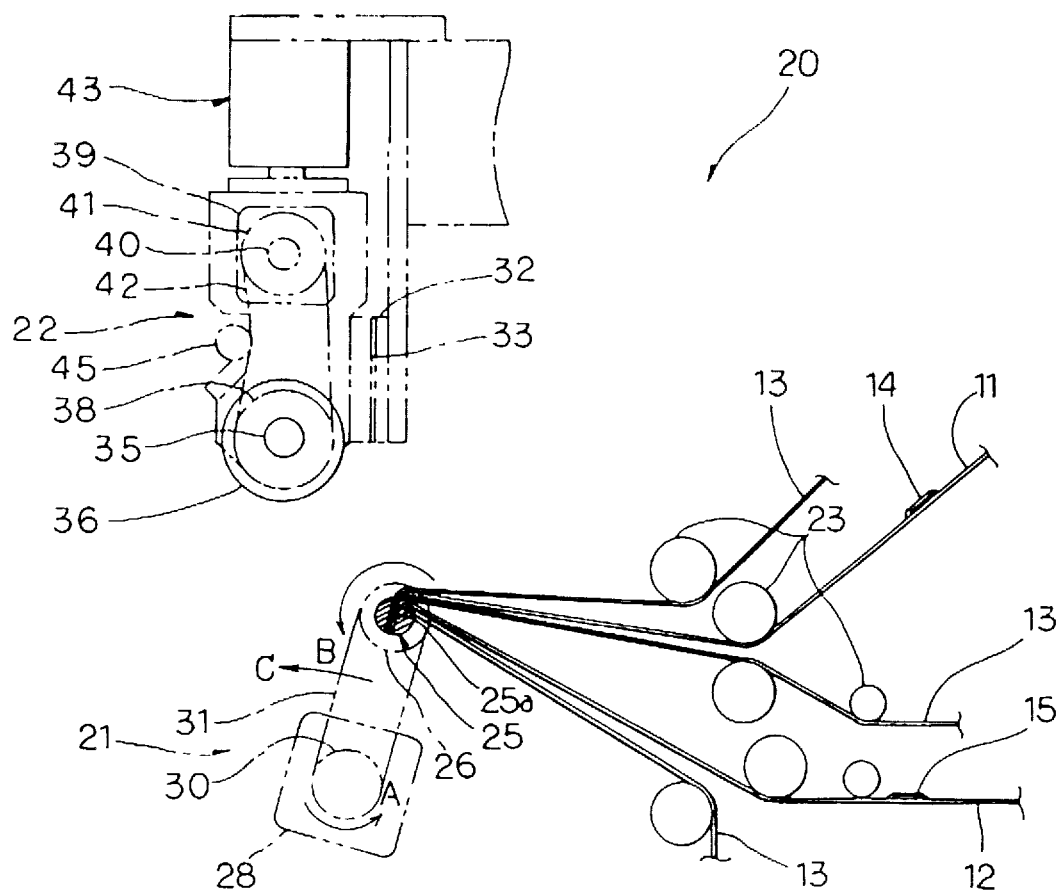

In reference to FIG. 7, with the aforementioned swingable arm (not shown) being turned to about 15° in the clockwise direction, the servomotor 28 is driven at a regulated rotation speed in the direction as indicated by the arrow mark A. The rotation is transmitted to the sheet rolling up shaft 25 through the pulley 30, the endless transmission belt 31 and the pulley 26. Thus the sheet rolling up shaft 25 is rotated at a regulated constant speed in the direction as indicated by the arrow mark B,and integrally rolls up the positive foil sheet 11, the negative foil sheet 12 and the isolating sheets 13 which are anchored to the rolling up shaft 25.

When a predetermined amount of the positive and negative foil sheets 11, 12 and the isolating sheets 13 is rolled up, the lead terminal attaching section (not shown) is separated to process a first positive lead terminal 14 to make a spot racing thereon fixedly attach the terminal 14 to the positive foil sheet 11 and then similarly process a first negative lead terminal 15 to make a spot facing thereon and fixedly attach the terminal 15 to the negative foil sheet 12.

When the first positive lead terminal 14 and the first lead terminal 15 have been rolled up as the sheets 11, 12, 13 are rolled up on the rolling up shaft 25, the swingable arm is turned in the direction as indicated by the arrow mark C to move the rolling up shaft 25 to a position vertically opposite to the rubber drive roller 36.

Figure 8:
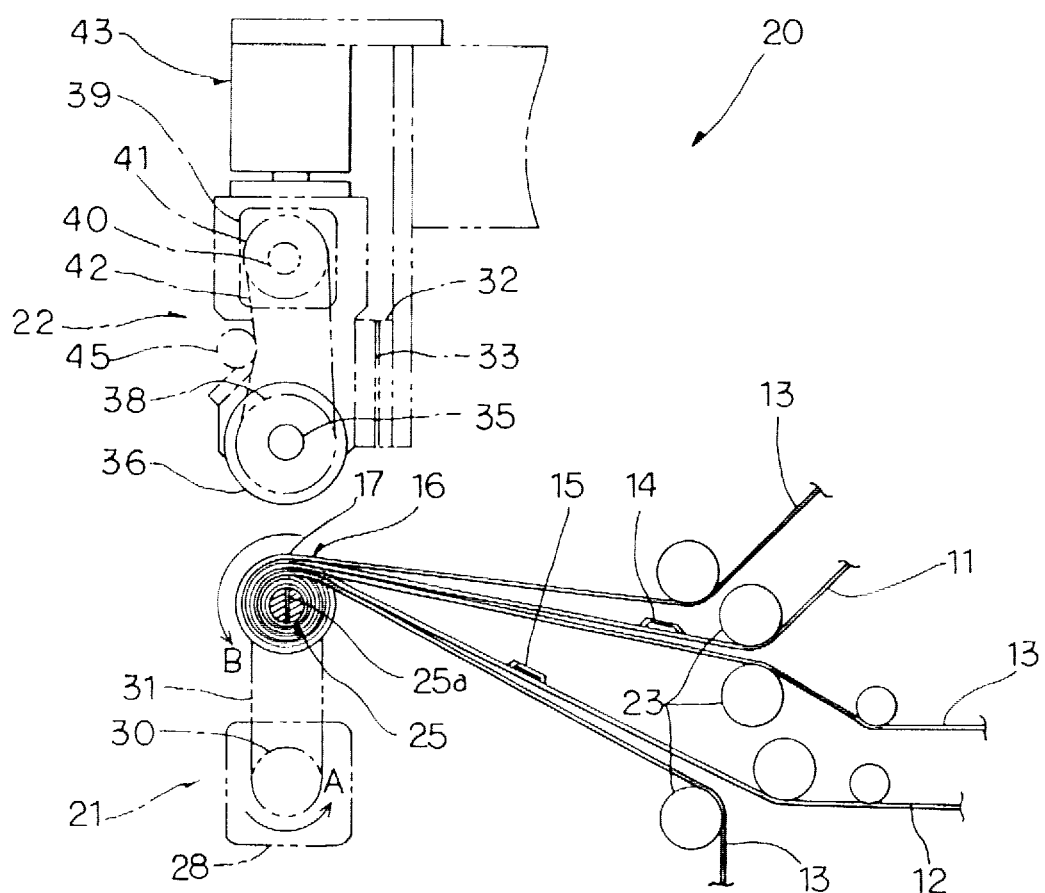
Figure 9:
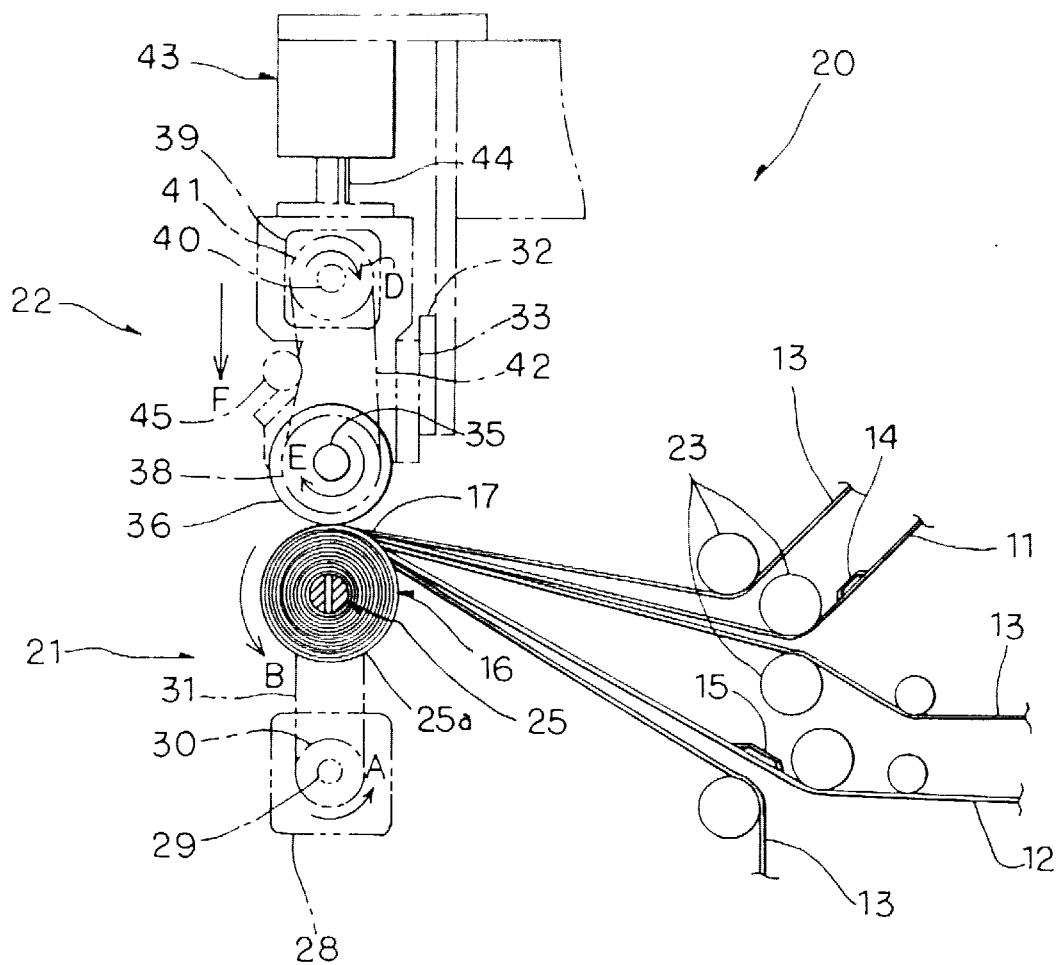

Subsequently in FIG. 8, the electric motor 28 is driven in the direction as indicated by the arrow mark A thereby to rotate the rolling up shaft 25 in the direction as indicated by the arrow mark B. The rolling up shaft 25 is rotated at a constant speed and rolls up the positive and negative foil sheets 11, 12 and the isolating sheets 13 as these sheets are supplied from the sheet supplying section 49. When a predetermined amount of the sheets 11, 12, 13 have been rolled up in FIG. 9, the compressed air is supplied to the fluid press cylinder 43. The fluid press cylinder 43 is then operated to extend the piston rod 44 thereby to move down the movable base 34 in the direction as indicated by the arrow mark F until the drive roller 36 is pressed against the circumferentially outer surface 17 of the sheets 11, 12, 13 as these sheets are rolled up.

The drive motor(torque motor) 39 is regulated to rotate with a constant torque and at a constant speed in the direction as indicated by the arrow mark D. The rotation is transmitted to the drive motor 36 through the pulley 41, the endless transmission belt 42, the pulley 38 arid the shaft 35, and the drive motor 36 is rotated in the direction as indicated by the arrow mark E at a constant speed and with a constant torque while the circumferential surface thereof is pressed against the condenser element 16.

The drive roller 36 pressed against the circumferential surface 17 of the condenser element 16 will cooperate with the sheet rolling up shaft 25 to roll up the positive and negative foil sheets 11, 12 and the isolating sheets 13 around the sheet rolling up shaft 25 in the direction as indicated by the arrow mark B. When a predetermined amount of the sheets 11, 12, 13 is rolled up, the lead attaching section is operated to process the next positive lead terminal 14 to make a spot facing thereon and fixedly attach the processed lead terminal 14 to the positive foil sheet 11, and then the lead attaching section is operated to process the next negative lead terminal 15 to make a spot facing thereon and fixedly attach the processed lead 15 to the negative foil sheet 12.

The same operation is repeated as the sheets 11, 12, 13 are rolled up, and three positive lead terminals 14 and three negative lead terminals 15 are attached one after another to the positive foil sheet 11 and the negative foil sheet 12 respectively in this embodiment. Thus when a predetermined total amount of the positive and negative foil sheets 11, 12 and the isolating sheets 13is rolled up, the electric motor 28 and the drive motor 39 are stopped, and the rolling up shaft 25 is axially moved out of the rolled up sheets 11, 12, 13. Thus the condenser element 16 is made up.

In reference to FIGS. 10 and 11, the positive and negative foil sheets 11, 12 and the isolating sheets 13 supplied from the sheet supplying section 49, are subjected to the fluctuating tensions caused by the periodical operation movements of a sheet supplying arm 51. For example, referring to FIG. 10, the periodical tension indicated by the curve C1 as shown in FIG. 10(a)is applied to the positive foil sheet 11. The periodical tension indicated by the curve C2 as shown in FIG. 10(b) is applied to the positive foil sheet 12. The periodical tension indicated by the curve C3 as shown in FIG. 10(c)is applied to the isolating sheets 13. The rolling up shaft 25 is subjected to the periodical tension indicated by the complicated curve C4 which is composed of the aforementioned three curves C1, C2, C3 as shown in FIG. 10 (d). Therefore if the rolling up shaft 25 is simply rotated to roll up the positive and negative foil sheets 11, 12 and the isolating sheets 13, the mentioned composite tension is applied to the sheets 11, 12, 13 while these sheets are rolled up and tightens the roll. Further as the roll is variably tightened in accordance with the fluctuation of the tension as indicated by the curve C4, the positive and negative foil sheets 11, 12 and the isolating sheets 13 will not be rolled up with an even degree of tension all through the rolling up process. As the result, the positive lead terminals 14 and the negative lead terminals 15 are circumferentially shifted from the respectively predetermined circumferential phases as the sheets are rolled up.

Figure 10A:
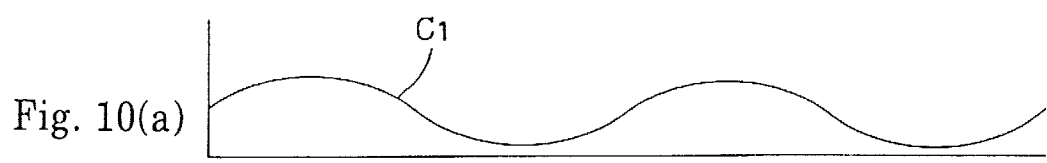
FIGS. 10(a)–10(d) are graphical representations of fluctuating tensions applied to a positive foil sheet, a negative foil sheet and an isolating sheet which form the condenser.
Figure 10B:
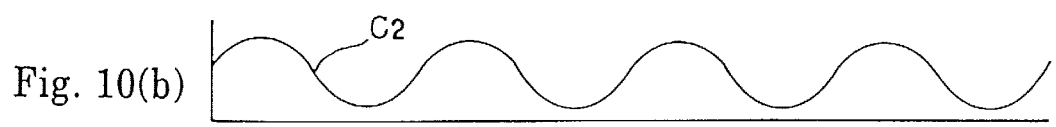
Figure 10C:
Figure 10D:
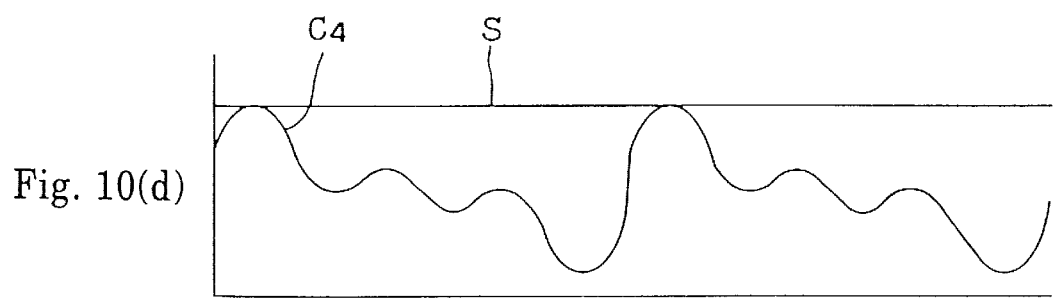

However according to the present invention, the positive and negative foil sheets 11, 12 and the isolating sheets 13 are rolled up by cooperation of the rolling up shaft 25 and the drive roller 36 which is rotated with the rolling up shaft 25 with a constant torque and at a constant rotation speed. Therefore the tension, which may otherwise be applied to the precededly rolled sheets 11, 12, 13, is eliminated at the sheet rolling up place, and the sheets 11, 12, 13 are continued to he rolled up with a constant tension S as shown in FIG. 10(d). The sheets 11, 12, 13 are therefore free of the tension which may cause the roll to be unevenly tightened, and may be rolled up with an even and constant tension. As the result,the three positive lead terminals 14 and the three negative lead terminals 15 maybe positioned at the circumferentially same phases respectively of the roll. Thus according to the invention, a condenser of extremely large capacity and of light weight may be easily made up. For example, a condenser of a diameter more than 50 mm φ and of a length more than 150 mm and a bigger condenser may be easily made up. More particularly according to the invention, in place of the very heavy lead storage battery, the condenser of very light weight and of large capacity maybe obtained as a secondary battery, for example, for the electric motor vehicle.

In this embodiment, the auxiliary rolling up section 22 is arranged above the sheet rolling up shaft 25. However it is needless to say that such arrangement is not limited to the embodiment. The auxiliary rolling up section 22 may be arranged below the rolling up shaft 25 and simultaneously the drive roller 36 may be arranged below the condenser element 16 so that the drive motor may be pressed against the condenser element 16 from below or obliquely from below.

Further the rolling up shaft 25 and the drive roller 36 are driven by way of the endless belts respectively in this embodiment. But these may be directly connected to the respective electric motors.

What is claimed is:

1. A method for producing a condenser element by rolling up a condenser element material including a positive foil sheet, a negative foil sheet and an isolating sheet placed one on another in combination, each of said positive foil sheet and said negative foil sheet having a plurality of preattached lead terminals with a predetermined space provided therebetween, said method comprising the steps of:

rolling up said condenser element material around a rolling up shaft rotated in one direction to run said condenser element material supplied thereto at a predetermined constant speed;

rotating a servo-motor in a direction opposite to the rotating direction of said rolling up shaft under control to provide said servo-motor with a predetermined constant torque;

applying said predetermined constant torque of said servo-motor to a rotational axis of a drive roller, thereby rotating said drive roller in the direction opposite to the rotating direction of said rolling up shaft; and pressing said drive roller against the outer surface of said condenser element material so that said drive roller may cooperate with said rolling up shaft to substantially eliminate a tension applied to a preceding wrap of rolled up condenser element material as said condenser element material is rolled up, thereby to prevent said condenser element material from being irregularly tightened, so that said plurality of lead terminals may be substantially arranged circumferentially in a same phase and diametrically in alignment.

2. An apparatus for producing a condenser element by rolling up a condenser element material including a positive foil sheet, a negative foil sheet and an isolating sheet placed one on another in combination, each of said positive foil sheet and said negative foil sheet having a plurality of preattached lead terminals with a predetermined space provided therebetween, said apparatus comprising:

a rolling up shaft rotated in one direction to run said condenser element material supplied thereto at a predetermined constant speed;

a servo-motor rotated in a direction opposite to the rotating direction of said rolling up shaft, said servo-motor being controlled to rotate with a predetermined constant torque; and a drive roller operatively connected to said servo-motor, said servo-motor applying said predetermined constant torque to said drive roller, causing the drive roller to be rotated thereby in the direction opposite to the rotating direction of said rolling up shaft, said drive roller being pressed against the outer surface of said condenser element material to cooperate with said rolling up shaft to substantially eliminate a tension applied to a preceding wrap of rolled up condenser element material as said condenser element material is rolled up, thereby to prevent said condenser element material from being irregularly tightened, so that said plurality of lead terminals may be arranged circumferentially in a same phase and diametrically in alignment.

3. A condenser element, comprising:

a condenser element material including a positive foil sheet, a negative foil sheet, and an isolating sheet placed one on another in combination; and a plurality of lead terminals preattached on said positive foil sheet and on said negative foil sheet with a predetermined space provided between said lead terminals, said condenser element material rolled up at a constant speed in a plurality of wraps of said condenser element material, said wraps being substantially tension free so that said condenser element material, which is tensioned prior to being rolled up, is prevented from being irregularly tightened as it is rolled up and said plurality of lead terminals are substantially arranged circumferentially in a same phase and diametrically in alignment.

* * * * *